United States Patent [19]

Murakami

[11] Patent Number: 5,706,701
[45] Date of Patent: Jan. 13, 1998

[54] WIRING-HARNESS CONNECTION STRUCTURE OF TRANSMISSION SHIFT-LEVER DEVICE

[75] Inventor: Takao Murakami, Hamamatsu, Japan

[73] Assignee: Fuji Kiko Co., Ltd., Tokyo, Japan

[21] Appl. No.: 637,164

[22] Filed: Apr. 24, 1996

[30] Foreign Application Priority Data

Apr. 28, 1995 [JP] Japan .................. 7-105128

[51] Int. Cl.⁶ .................................. F16H 59/04
[52] U.S. Cl. .................... 74/335; 200/61.88; 74/473 R
[58] Field of Search .................. 439/34; 74/335, 74/473 R, 543; 477/97; 200/61.88

[56] References Cited

FOREIGN PATENT DOCUMENTS 63-171815  11/1988  Japan .
5-005324   2/1993   Japan .
5-024845   6/1993   Japan .

Primary Examiner—Neil Abrams
Assistant Examiner—Eugene Byrd
Attorney, Agent, or Firm—Foley & Lardner

[57] ABSTRACT

A wiring-harness connection structure of a transmission shift-lever device including a shift knob with a switch, comprises a conducting line connected to a switch attached to the shift knob at an upper end thereof, the conducting line partially exposed inside of a lower opening end of the shift knob at a lower end thereof to provide a male plug, and a wiring-harness connector having a female receptacle fittable onto the plug, and a caulked portion through which the harness connector is connected to a harness end. A harness holder is detachably fitted to the lower opening end of the shift knob. The harness holder has a harness-end mounting hole, for preventing the harness end from disconnecting from the harness holder by abutment between the caulked portion and the harness holder.

10 Claims, 6 Drawing Sheets

WIRING-HARNESS CONNECTION STRUCTURE OF TRANSMISSION SHIFT-LEVER DEVICE

BACKGROUND OF THE INVENTION

1. Field of the Invention

The present invention relates to a wiring-harness connection structure of a transmission shift-lever device (transmission selector-lever device) for automotive vehicles, and specifically to a structure for connecting conducting lines accommodated in an automobile transmission shift-lever knob with a switch, such as a so-called overdrive control switch (hereafter OD switch), to a vehicle body wiring-harness.

2. Description of the Prior Art

As is generally known, a transmission shift-lever device for automobiles is used to change gears in a transmission. In modern vehicles equipped with an automatic transmission which provides four or five forward speeds and reverse, an OD switch is often provided in the shift-lever knob (or the shift handle), so as to permit the shift to overdrive when the OD switch is turned ON and to inhibit the shift to overdrive when the OD switch is turned OFF. The OD switch is connected to a pair of conducting lines (or conductors) which are typically buried in a lower pipe-like section of the shift knob, to generate signals indicative of switched-ON or switched-OFF states of the OD switch into an automatic transmission control unit. Wiring harnesses are connected to the above-noted two conductors of the OD switch at the lower end of the pipe-like section of the shift knob to deliver therethrough the switched-ON or switched-OFF signals to the transmission control unit. On vehicles with an automatic transmission, the shift lever device is usually comprised of a console-type transmission shift lever assembly rather than a floorboard mounted shift lever assembly. The console-type transmission shift lever device includes a shift lever pivotally mounted on a housing-and-shift-lever-bracket assembly and linked to transmission control linkages, a lower pipe-like knob section firmly secured onto the upper end of the shift lever, an upper knob section usually formed integral with the pipe-like knob section, and a position-indicator cover assembly which is provided for indicating a parking position (P range), a neutral position (N range), a drive position (D range), a second position (2 range) and a first position (1 range or L range), for example. The housing-and-shift-lever-bracket assembly is fixed onto the floorboard of the vehicle. The position indicator cover has an elongated slot through which the pipe-like knob section is projected upwards. The forward-and-backward motion of the shift-knob provides a shift into the desired range. In the disassembled state of the shift lever assembly from the vehicle floorboard, the conductors connected to the OD switch are separate from the vehicle body wiring-harness. When assembling the shift lever assembly on the vehicle console, the conductors of the OD switch are finally connected to the respective harness ends by means of caulking, soldering, or the like. The junction of the harness end and one end of the conductor tends to be exposed, and thus the junction must be insulated by way of the other part, for example an insulating tube. Such an insulating work must be made in a limited space in the vehicle console. This is troublesome. Also, the soldering work requires an expensive equipment. In Japanese Utility Model Provisional publication No. 63-171815, a relatively expensive harness-coupler is used instead of soldering or caulking. Japanese Utility Model Second Publication No. 5-5324 teaches the provision of a code holder for increasing the durability of the harness connecting portion. However, the conductors embedded in the shift knob are connected to respective vehicle body harness terminals by way of soldering. Thus, an expensive equipment for soldering work was necessary. The wire-harness connection structure disclosed in the Japanese Utility Model Second Publication No. 5-5324 requires an additional code clamper for clamping codes onto the code holder. This results in an increase in the number of parts of the code holder assembly. On the other hand, Japanese Utility Model Second Publication No. 5-24845 discloses a harness connection structure according to which a code holder is provided at the bottom end of the pipe-like shift knob and additionally a code connector (or a harness connector) is formed integral with the code holder. Therefore, the code connector is almost rigid and stationary with respect the code holder, the code has a flexibility and movable except the code end connected to the code holder. For electrical connection with the code end, a portion of the code holder is partially exposed from the code holder. The securely-fastened point between the harness end and the partially-exposed portion of the code holder tends to be subjected to repeated stress due to input vibrations applied to the vehicle body. In the event that the code or the harness oscillates owing to vibrations imposed on the vehicle body, there is a possibility that the securely-fastened point between the code connector and the code end is damaged due to repeated load or alternating stress. In the case that the code connector is integrally fixed to the code holder, the code cannot be easily replaced with a new part.

SUMMARY OF THE INVENTION

Accordingly, it is an object of the invention to provide an improved wiring-harness connection structure of a transmission shift-lever device including a shift knob with a switch which avoids the foregoing disadvantages of the prior art.

It is an object of the present invention to provide a simple wiring-harness connection structure of a transmission shift-lever device including a shift knob with a switch which provides a superior mechanical strength against any load.

It is another object of the invention to provide an inexpensive wiring-harness connection structure of a transmission shift-lever device including a shift knob with a switch in which a vehicle body harness is easily replaceable.

In order to accomplish the aforementioned and other objects of the invention, a wiring-harness connection structure of a transmission shift-lever device including a shift knob with a switch, the shift knob being fitted onto an upper end of a shift lever and projected from an elongated shift slot of a position-indicator cover, the connection structure comprises a conducting line connected to a switch attached to the shift knob at an upper end thereof, the conducting line partially exposed inside of a lower opening end of the shift knob at a lower end thereof to provide a male plug, a wiring-harness connector having a female receptacle fittable onto the male plug, and a caulked portion through which the harness connector is connected to a harness end of a wiring harness, and a harness holder having a harness-end mounting hole into which the harness end is fittable, the harness holder being detachably fitted to the lower opening end of the shift knob for preventing the harness connector and the harness end in connection from disconnecting from the harness holder by abutment between the caulked portion and the harness holder. The harness holder has a substantially cylindrical central hollow through which an upper end of a shift lever is inserted into the lower opening end of the shift knob, and the harness holder has an aperture for intercommunicating the substantially cylindrical central hollow and the harness-end mounting hole and for permitting the harness end to fit into the harness-end mounting hole. Preferably, the harness holder has a projection radially outwardly extending from an outer periphery of the harness holder, whereas the lower opening end of the shift knob has a slot. Thus, the harness holder is fully fitted to the lower opening end by fully engaging the projection with the slot. It is preferable that at least two pairs of the slot and the projection are provided so that the at least two pair are diametrically opposed to each other with respect to a central axis of the lower opening end. Preferably the harness holder may have a flanged portion and a cut-out. The flanged portion and the cut-out are cooperative with an inner peripheral wall of the lower opening end for defining a slight aperture between them for removal of the harness holder from the lower opening end. Preferably the projection of the harness holder may have a tapered portion. The tapered portion is up-sloped inwardly and radially with respect to the central axis of the lower opening end so that the harness holder is smoothly snapped back towards a less stressed position in the lower opening end.

According to another aspect of the invention, a wiring-harness connection structure of a transmission shift-lever device including a shift knob with a switch, the shift knob being fitted onto an upper end of a shift lever and projected from an elongated shift slot of a position-indicator cover, the connection structure comprises a conducting line connected to a switch attached to the shift knob at an upper end thereof, the conducting line partially exposed inside of a lower opening end of the shift knob at a lower end thereof to provide a male plug, a wiring-harness connector having a female receptacle fittable onto the male plug, a first caulked portion caulked onto an endmost stripped, non-insulated wire portion of a harness end of a wiring harness, and a second caulked portion caulked onto a wrapped, insulated wire portion of the harness end, a conducting-line guide integrally formed with the shift knob near the lower opening end, the conducting-line guide having a guide hole into which the male plug of the conducting line is inserted and a cylindrical hollow portion into which the male plug is partially exposed via the guide hole, the conducting-line guide being provided for fully accommodating the harness connector in the cylindrical hollow portion for electrical insulation, and a harness holder having a harness-end mounting hole into which the harness end is fittable, the harness holder being detachably fitted to the lower opening end of the shift knob for preventing the harness connector and the harness end in connection from disconnecting from the harness holder by abutment between the second caulked portion and the harness holder. The guide hole, the cylindrical hollow portion and the harness-end mounting hole may be preferably aligned with each other with respect to a central axis of the guide hole.

DESCRIPTION OF THE PREFERRED EMBODIMENTS

Figure 1:
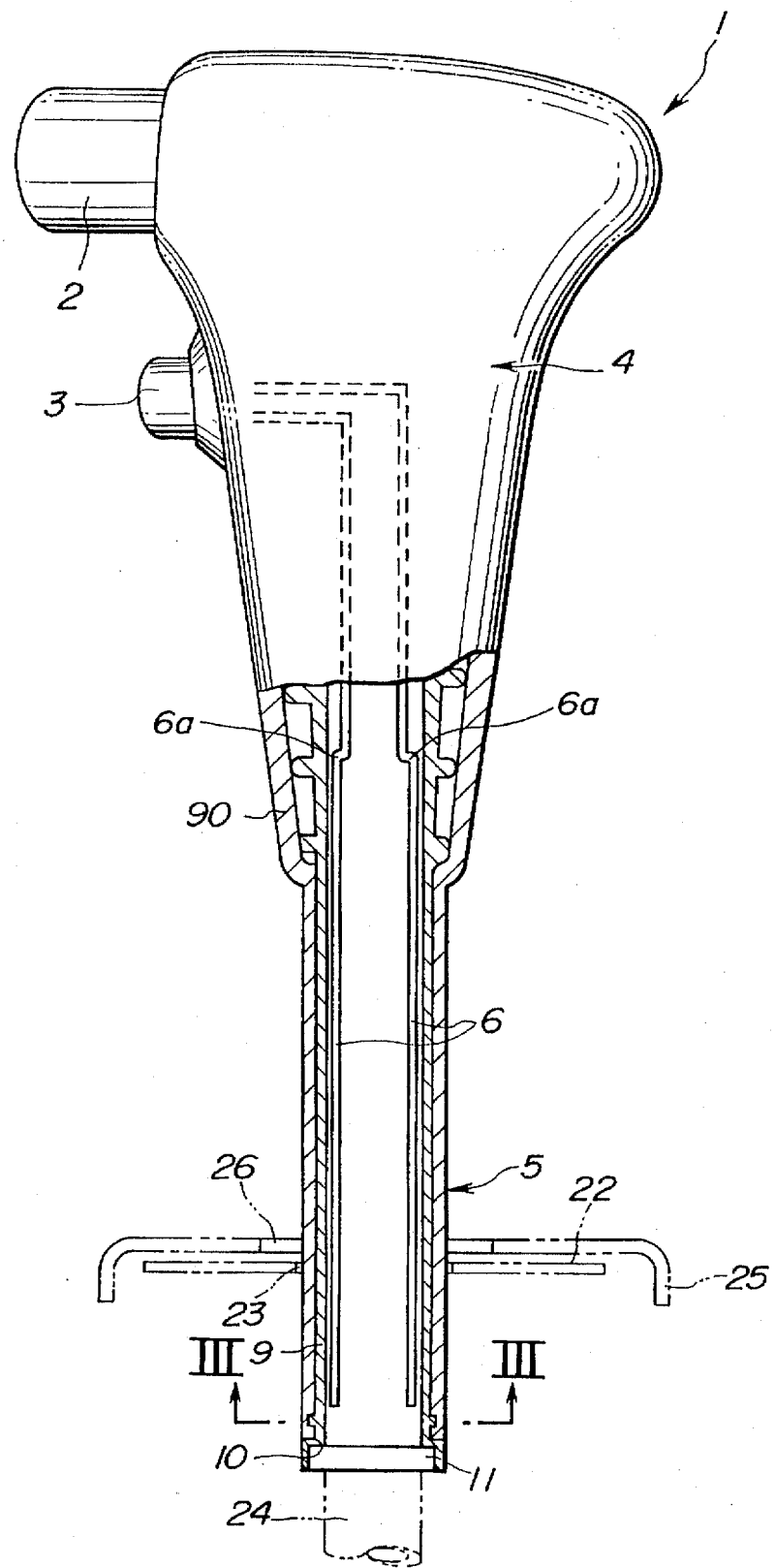
FIG. 1 is a front view illustrating one embodiment of a shift-lever knob assembly of the present invention, partly cross-sectioned.
Figure 2:
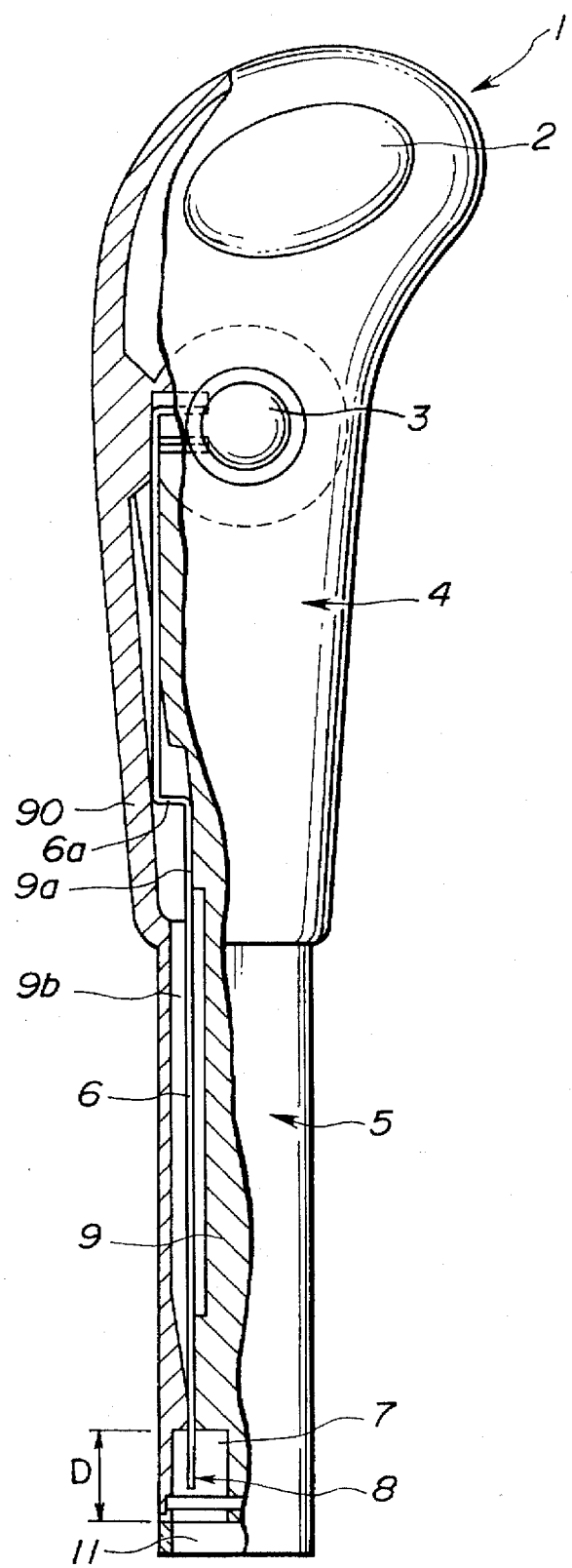
FIG. 2 is a side view illustrating the shift-lever knob assembly of FIG. 1, partly sectioned.
Figure 3:
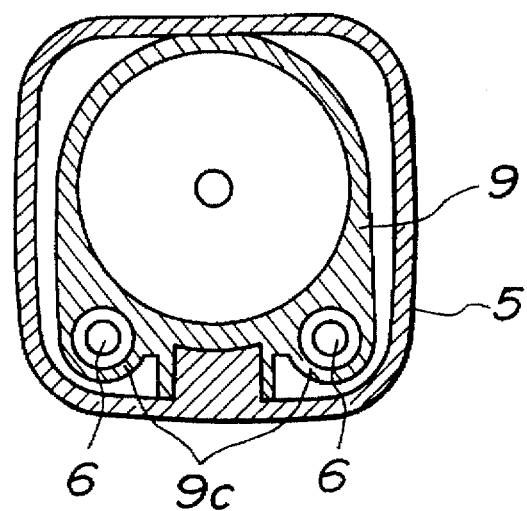
FIG. 3 is a lateral cross-sectional view taken along the line III—III of FIG. 1.

Referring now to the drawings, particularly to FIGS. 1 through 3, the wiring-harness connection structure of the invention is exemplified in case of a shift lever of an automotive vehicle equipped with an automatic transmission which transmission provides at least four forward speeds (including overdrive) and reverse. In a conventional manner, the shift knob 1 includes an upper shift-knob section (corresponding to a shift handle) 4 and a pipe-like knob section 5. As seen in FIG. 1, the upper shift-knob section 4 is equipped with an overdrive control switch (OD switch) 3 and a push button 2 which button is manually operated and functions as an operating button for a shift-lever stopper. Generally, the OD switch 3 and the push button 2 are provided at one side of the shift knob 1. The upper shift-knob section 4 and the lower pipe-like knob section 5 are integrally formed with each other. Actually, the shift knob 1, consisting of the upper shift-knob section 4 and the lower pipe-like knob section 5, is comprised of a knob skeleton frame 9 (containing a lower pipe-like cylindrical hollow section) and an outside skin 90 fitted onto the skeleton frame 9. The skeleton frame 9 is preferably formed of electrical-insulating hard synthetic resin, whereas the skin 90 is formed of soft synthetic resin such as foamed urethane. As seen in FIG. 1, the lower section of the skeleton frame 9 of the embodiment is molded into a substantially cylindrical hollow form. The lower cylindrical hollow section of the skeleton frame 9 has a stepped portion 10 at the lower opening end 11 so that the lower opening end 11 is slightly enlarged diametrically as compared with the inside dimension of the most part of the cylindrical hollow section of the skeleton frame 9. The shift knob 1 is firmly fitted onto or connected to the upper end of a pipe-like shift lever 24 through an elongated shift slot 26 formed on a position-indicator cover assembly 25 and an opening 23 (contoured to be somewhat greater than the outer periphery of the lower pipe-like cylindrical hollow section of the shift knob) of a longitudinally elongated slide plate 22 which plate moves together with the shift lever. As clearly seen in FIGS. 1 and 2, reference numeral 6 denotes a pair of rod-like signal lines. Each signal line is generally formed of a non-insulated conducting line or conductor. Upper ends of the conductors 6 are electrically connected to respective terminals of the OD switch 3 and spaced apart from each other. Each conductor 6 is often formed with a cranked or stepped portion 6a such that the pair of rod-like conductors 6, which are connected to the respective terminals of the switch 3, extend downwardly along the outside guide surface 9a of the cylindrical hollow section of the skeleton frame 9. As seen in FIG. 2, reference numeral 9b denotes an internal space defined between the outside wall surface of the skeleton frame 9 and the inside wall surface of the skin 90. The conductors 6 are delivered towards the lower opening end 11 of the cylindrical hollow section of the skeleton frame 9 through the internal space 9b. As can be appreciated from FIG. 2, two opposing pairs of substantially right-angled portions of the respective cranked portions 6a are in friction-contact with the outside guide surface 9a of the cylindrical hollow section of the skeleton frame 9 and the inner wall surface of the skin 90, thus preventing the conductors 6 from displacing relative to the shift lever assembly.

Figure 5A:
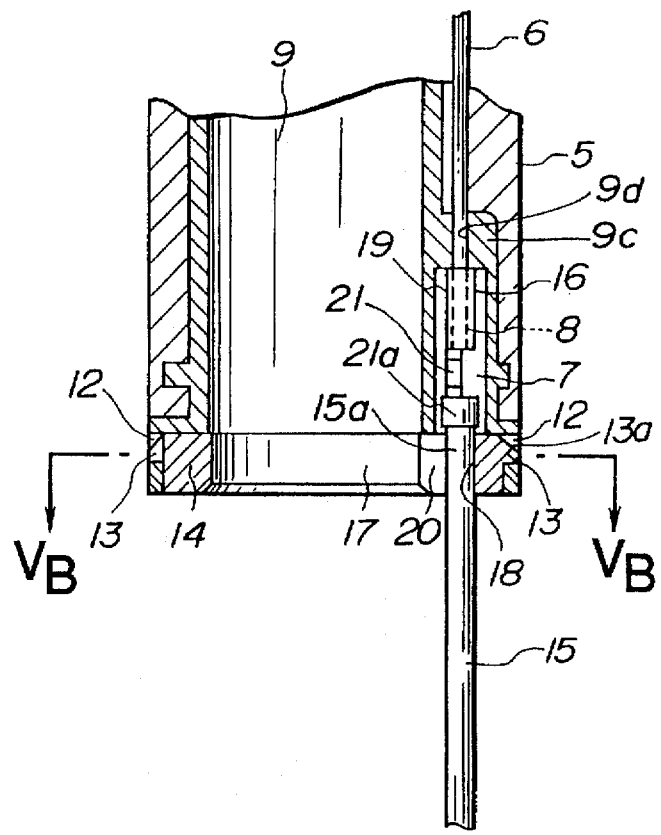
FIG. 5A is a longitudinal cross-sectional view illustrating the lower pipe-like portion of the shift-knob, taken along the line VB—VB of FIG. 5B.
Figure 6:
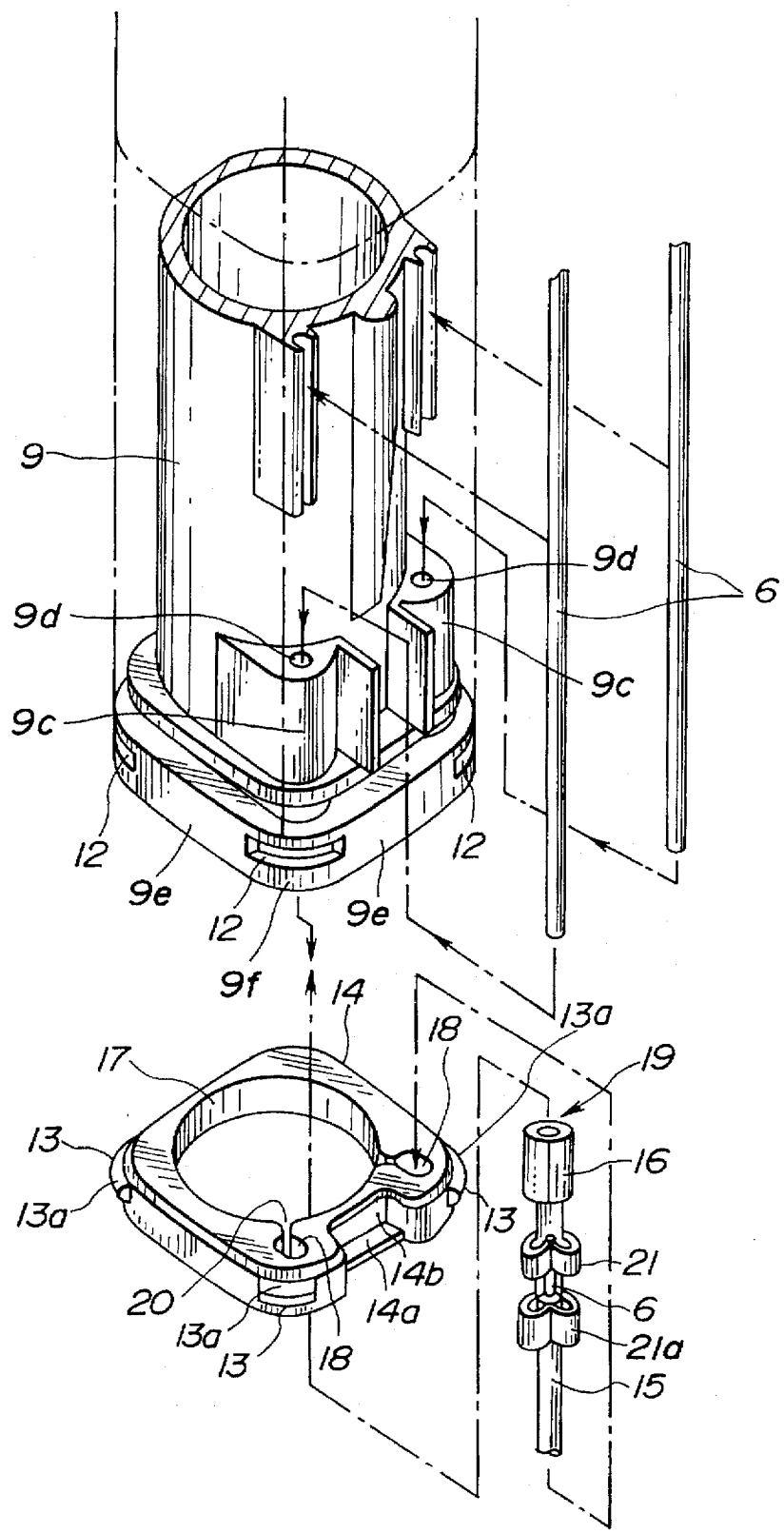
FIG. 6 is a dis-assembled view illustrating the essential portions of the invention.

As best seen in FIGS. 5A and 6, the skeleton frame 9 is integrally formed with a pair of conducting-line guides 9c at the lower end of its cylindrical hollow section. Each conducting-line guide 9c has a guide hole 9d and an essentially cylindrical hollow portion 7, both intercommunicating with each other. As seen in FIGS. 2 and 5A, the lower end of the conductor 6 is inserted into the guide hole 9d and partially exposed into the hollow portion 7. The partially-exposed portion of the conductor 6 functions as a male plug 8. The depth or the entire length D of the cylindrical hollow portion 7, measured in the longitudinal direction of the lower pipe-like knob section 5, is designed to be greater than the entire length of a wiring-harness connector 19 containing a socket 16 (or a female receptacle) and upper and lower caulked portions 21 and 21a as will be more fully discussed later, so as to satisfactorily accommodate and electrically insulate an electrical-contact portion, formed by the plug plugged in the receptacle 16, from another conducting portion.

Figure 5B:
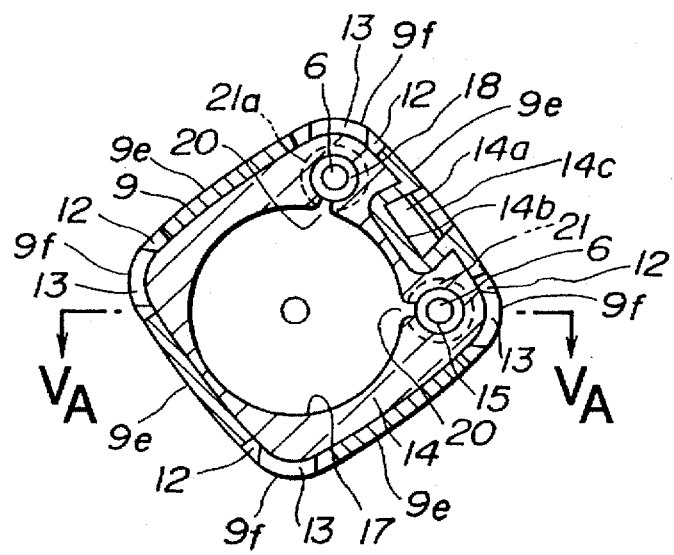
FIG. 5B is a lateral cross-sectional view taken along the line VA—VA of FIG. 5A.

Referring to FIGS. 5A, 5B and 6, particularly to FIG. 5B, the lower opening end of the cylindrical hollow section of the skeleton frame 9 is a substantially square form. The square form is constructed by four sides 9e of a comparatively greater curvature and four corners 9f of a comparatively smaller curvature, each corner 9f interconnecting the two adjacent sides 9e. In the shown embodiment, each smaller-curvature corner 9f has an engaged slot 12. As best seen in FIG. 5B and 6, a harness holder (or a harness stopper) 14 is detachably fitted to the lower opening end 11 of the cylindrical hollow section of the skeleton frame 9. To provide a detachable fit of the harness holder 14 onto the lower opening end 11 of the skeleton frame 9, the harness holder 14 has four radially-extending, engaging projections 13 on four corners 9f of the outer periphery of the harness holder 14 so that the four engaging projections 13 are brought into engagement with the respective engaged slots 12. As best seen in FIGS. 5A and 5B, the harness holder 14 has two harness-end mounting holes 18. One end 15a of the vehicle-body wiring harness 15 is properly fitted into the associated harness-end mounting hole 18 as herebelow described in detail. The endmost portion of the harness end 15a is partially stripped by way of a usual wire stripper for the purpose of electrical connection with a harness-connector 19. As seen in FIG. 5A, the harness-connector 19 is formed with a socket or plug receptacle 16. At the same time when the harness holder 14 is completely fitted to the pipe-like bottom end of the skeleton frame 9 under a condition in which the two harness ends 15a are mounted in or fitted into the respective harness-end mounting holes 18 of the harness holder 14, the female receptacles 16 of the harness connectors 19 are fitted onto the respective male plugs 8 of the conductors 6, thus resulting in electrical connection between the wiring harness 15 and the associated conductor 6. As shown in FIG. 5A, each harness connector 19 comprises the female receptacle 16, and upper and lower caulked portions 21 and 21a both being formed integral with the receptacle 16. The upper caulked portion 21 is caulked onto the endmost stripped, non-insulated wire portion of the harness end 15a, while the lower caulked portion 21a is caulked onto the wrapped, insulated wire portion of the harness end 15a. In the shown embodiment, so-called open-barrel type terminals for use in automotive vehicles are used as the harness connectors 19.

As shown in FIGS. 4, 5A, 5B and 6, the harness holder 14 is substantially ring-shaped. The outer periphery 6 of the harness holder 14 is shaped to the desired contour essentially identical to the inner periphery of the lower opening end 11 of the skeleton frame 9 so that the harness holder 14 is properly fit into the lower end of the skeleton frame 9. As clearly seen in FIG. 6, each engaging projection 13 of the harness holder 14 is formed with a tapered portion 13a. The tapered portion 13a is designed to be up-sloped inwardly and radially with respect to the central axis of the lower opening end 11 of the skeleton frame 9, and thus the harness holder 14 is smoothly snapped back towards its unstressed or less stressed position in the lower opening end 11 of the skeleton frame 9 by virtue of elastical deformation of the slightly-enlarged lower end of the cylindrical hollow section of the skeleton frame 9. As appreciated from FIG. 5B, it is preferable that at least two slot-and-projection pairs (12, 13; 12, 13), which are diametrically opposed to each other with respect to the central axis of the lower opening end 11 of the pipe-like shift knob section, are provided for the purpose of fully fitting the harness holder 14 to the lower opening end 11. The substantially ring-shaped harness holder 14 has a substantially cylindrical central hollow 17 through which the upper end of the shift lever 24 is firmly fitted into the pipe-like knob section 5. The harness holder 14 has the two harness-end mounting holes 18 in the vicinity of its two adjacent corners. In order to ensure easy electrical-connection between the male plug 8 of the conductor 6 and the associated female receptacle 16 of the harness connector 19, the guide holes 9d of the conducting-line guides 9c are axially aligned with the respective harness-end mounting holes 18. For the same reason, it is preferable that the cylindrical hollow portion 7 and the guide hole 9d, intercommunicated with each other, are axially aligned to each other. That is, the guide hole 9d, the cylindrical hollow portion 7 and the harness-end mounting hole 18 are aligned with each other with respect to the central axis of the guide hole 9d. The harness-end mounting hole 18 is circular or elliptical in cross-section. To provide the proper fit between the harness-end mounting hole 18 and the wrapped insulated wire portion of the harness end 15a, the inside diameter of the mounting hole 18 is substantially equal to the outside diameter of the wrapped wire portion of the harness. As best seen in FIGS. 5B and 6, for the purpose of easy installation and removal of the harness end 15a into and from the harness-end mounting hole 18, the harness holder 14 is formed with two apertures 20 such that each of the apertures 20 opens essentially towards the center axis of the central cylindrical hollow 17. The aperture 20 is arranged for communicating the associated harness-end mounting hole 18 with the central cylindrical hollow 17. The aperture 20 is designed to be smaller than the outside diameter of the wrapped portion of the harness 15, with the result that, with the harness end 15a and the harness connector 19 integrally connected to each other, the harness end 15a is easily installed into (or fitted into) and removed from the harness-end mounting hole 18 under a disconnected condition in which the harness holder 14 is disconnected from the lower end of the skeleton frame 9. As seen in FIGS. 5A, 5B and 6, after the harness end 15a has been integrally connected to the harness connector 19 by means of an electric-work pliers, a clipping pliers, a wire stripper or the like, the cross section of each of the upper and lower caulked portions 21 and 21a is shaped to a substantially cardioid form (see FIG.

6). Usually, the upper caulked portion 21 is firmly caulked to the stripped, non-insulated wire portion of the harness end 15a such that its outside dimension is substantially equal to or slightly less than the outside diameter of the wrapped portion of the harness end. On the other hand, the lower caulked portion 21a is firmly caulked to the non-stripped, wrapped wire portion of the harness end 15a such that its outside dimension is remarkably greater than the outside diameter of the wrapped portion of the harness end and additionally greater than the inside diameter of the harness-end mounting hole 18. Thus, assuming that the harness 15 is pulled downwardly (viewing FIG. 5A) under the assembled condition, the lower caulked portion 21a acts to effectively withstand tensile load applied to the harness end. Thus, even when tensile load is accidentally applied to the wire harness, the harness end 15a cannot be easily disconnected from the harness holder. In other words, the connection relationship between the harness holder 14 and the harness end 15a in connection with the harness connector 19 ensures a great tensile strength. The above-noted harness holder 14 is preferably made of the same synthetic resin as the skeleton frame 9, such as an electrical-insulating hard synthetic resin. With the above-noted wiring-harness connection structure, the upper caulked portion 21 provides good conductivity, whereas the lower caulked portion 21a provides a sufficient mechanical strength particularly with regard to tensile load acting at the harness 15 as will be explained later.

In contrast to the above, under a condition wherein the harness holder 14 is disconnected from the lower end of the skeleton frame 9, the harness connector 19 and the harness end 15a in connection can be easily removed from the harness-end mounting hole 18 by pulling the harness end 15a towards the center axis of the central cylindrical hollow 17 of the harness holder 14 so that the harness end shifts from the harness-end mounting hole 18 through the aperture 20 to the central cylindrical hollow 17.

Figure 4:
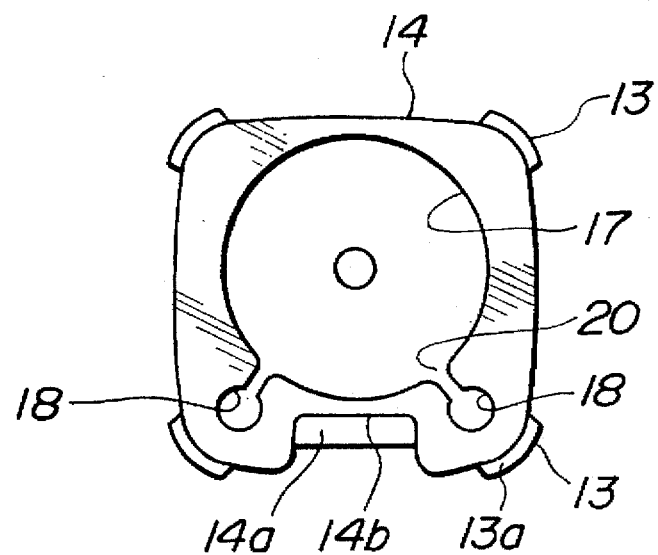
FIG. 4 is a plan view illustrating a harness holder (or a harness stopper) made according to the present invention.
Figure 7:
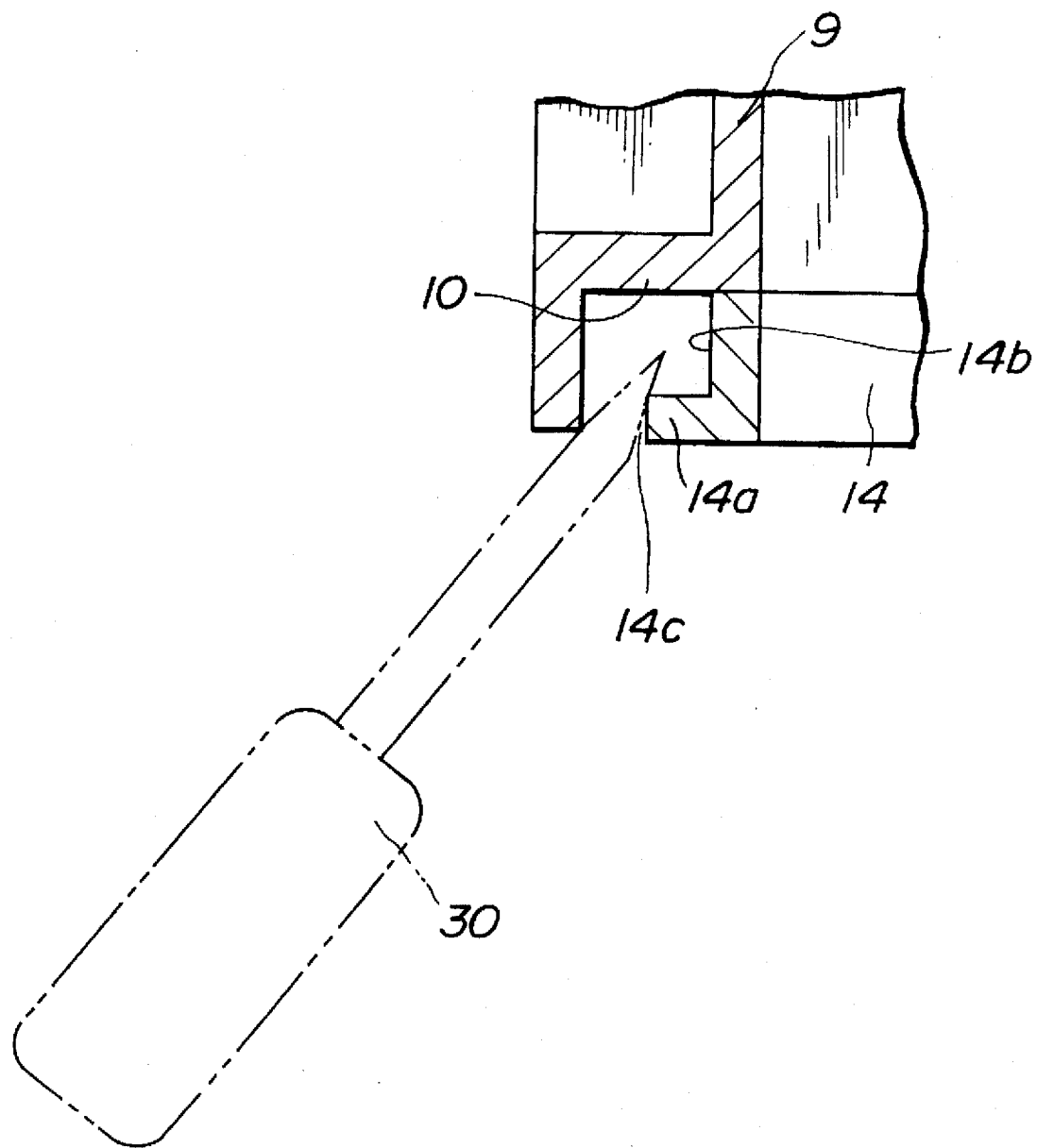
FIG. 7 is an explanatory view illustrating the removal procedure of the harness holder (or a harness stopper) made according to the invention.

In the shown embodiment, in order to easily disconnect the harness holder 14 itself from the lower end of the skeleton frame 9, as shown in FIGS. 4 and 5B, the harness holder 14 is formed integral with a flanged portion 14a and a cut-out 14b. The flanged portion 14a and the cut-out 14b are cooperative with the inner peripheral wall of the lower end of the cylindrical hollow section of he skeleton frame 9 to define a slight aperture 14c between the outer periphery of the harness holder 14 and the cylindrical hollow section of the skeleton frame 9. As appreciated from the phantom line indicated in FIG. 7, for example, the tip of a minus screw driver 30 can be easily inserted into the cut-out 14b through the slight aperture 14c. Thus, the engaging projections 13 of the harness holder 14 can be easily disconnected from the engaged slots 12 of the skeleton frame 9 by pushing the flanged portion 14a by the tip of the screw driver.

For instance, the procedures for assembling the shift lever device are as follows.

The harness end 15a is firstly connected to the harness connector 19 by caulking by means of a usual electrical-work pliers or the like. As seen in FIG. 6, the respective harness end 15a in connection with the harness connector 19 is fully fitted into the harness-end mounting hole 18 through the cylindrical hollow 17 and the aperture 20. Under a condition (see FIG. 1) wherein the pipe-like knob section 5 is inserted into the circular opening 23 of the slide plate 22 via the elongated slot 26 of the position-indicator cover assembly 25, the harness holder 14 is pushed into the lower opening end 11 of the skeleton frame 9 in the upward direction (viewing FIG. 5A). Owing to the upward push of the harness holder 14, the projections 13 of the harness holder 14 are forced to snap back towards their unstressed or less-stressed positions into the respective slots 12 of the lower opening end 11 of the skeleton frame 9, and simultaneously the two female receptacles 16 of the harness connectors 19 are forced to fit onto the respective male plugs 8 of the conductors 6. As soon as the harness holder 14 has been guided and moved into the completely-snapped position shown in FIG. 5A by virtue of the tapered portions 13a, the harness holder 14 is completely held at its fully engaged position. Thereafter, the pipe-like knob section 5 is fully fitted onto the upper end of the shift lever 24. Then, the position-indicator cover assembly 25 is secured onto the housing-and-shift-lever-bracket assembly.

With the previously-noted arrangement, in the event that the harness 15 is accidentally pulled in a direction wherein the receptacle 16 disengages from the plug 8, the lower caulked portion 21a abuts the upper face of the harness holder 14 since the harness holder 14 is firmly fitted to the lower opening end 11. The abutment prevents the receptacle 16 from disconnecting from the plug 8. Therefore, there is less possibility of imperfect contact between the conductor 6 and the associated harness 15, even when the harness 15 is accidentally pulled during assembling or after assembling. Under the fully-fitted condition wherein the holder 14 is fully fitted to the lower opening end 11 and the harness end 15a is of course fitted into the harness-end mounting hole 18 together with the harness connector 19, the receptacle 16 and the upper and lower caulked portions 21 and 21a are accommodated in the cylindrical hollow 7 of the conducting-line guide 9c, thus reliably avoiding one of the two stripped, non-insulated wire portions of the harness ends 15a from being brought into electrical-contact with the other non-insulated wire portion. This eliminates the need for insulating tubes. In the previously-discussed harness connection structure, since the lower caulked portion 21a can be brought into abutment with the upper face of the harness holder 14, there is less downward displacement of the receptacle 16 to the plug 8 under the fully-snapped condition of the harness holder 14. The abutment between the lower caulked portion 21a and the perimeter of the upper opening of the harness-end mounting hole 18 ensures a great mechanical strength particularly a great tensile strength. Also, even when the harness connecting portion (or the harness end 15a) of the harness connector 19 experiences a bending moment due to undesired torsional force applied to the harness 15 or experiences a repeated stress due to input vibrations applied to the vehicle body, there is less possibility of breaking of the harness connecting portion, because the harness end 15a and the lower caulked portion 21a can provide a proper flexibility in conjunction with the aperture 20 and a slight clearance between the outer peripheral surface of the lower caulked portion 21a and the inner peripheral surface of the cylindrical hollow 7 of the conducting-line guide 9c. The above-noted flexibility can prevent input vibrations applied to the vehicle body from exerting a bad influence on the harness connecting portion. As set out above, the harness connection structure of the embodiment can ensure a superior mechanical strength (a great fatigue strength as well as a great tensile strength) under a condition wherein the harness holder 14 is fully fitted to the lower opening end 11. Under another condition wherein the harness holder 14 is disconnected from the lower opening end 11, the harness connector 19 (or the harness end 15a) is easily removed from or installed into the harness-end mounting hole 18. In other words, the harness itself is easily replaceable with a new part, in the event that the harness 15 has been damaged unintendedly. Also, the harness end 15a can be quickly fitted into the harness-end mounting hole 18 by way of one push and additionally the harness holder 14 is allowed to quickly snap back into the lower opening end 11 by way of one push, and thus the efficiency of assembling the shift lever device on the vehicle body can be enhanced. As a result, the total production costs are reduced. Moreover, the wiring-harness connection structure of the invention merely requires a usual electrical-work pliers and inexpensive typical harness connectors for example so-called open-barrel type terminals, whereas hitherto an expensive equipment for soldering was necessary for electrical connection between the plug receptacle and the harness end and/or insulating tubes was necessary.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A wiring-harness connection structure of a transmission shift-lever device including a shift knob with a switch, said shift knob being fitted onto an upper end of a shift lever and projected from an elongated shift slot of a position-indicator cover, said connection structure comprising:

a conducting line (6) connected to a switch (3) attached to a shift knob (1) at an upper end thereof, said conducting line (6) partially exposed inside of a lower opening end (11) of the shift knob at a lower end thereof to provide a male plug (8);

a wiring-harness connector (19) having a female receptacle (16) fittable onto said male plug (8), and a caulked portion (21a) through which said harness connector (19) is connected to a harness end (15a) of a wiring harness (15); and a harness holder (14) having a harness-end mounting hole (18) into which said harness end (15a) is fittable, said harness holder (14) being detachably fitted to the lower opening end (11) of the shift knob (1) for preventing said harness connector (19) and said harness end (15a) in connection from disconnecting from said harness holder (14) by abutment between said caulked portion (21a) and said harness holder (14).

2. The wiring-harness connection structure as claimed in claim 1, wherein said harness holder (14) has a substantially cylindrical central hollow (17) through which an upper end of a shift lever is inserted into said lower opening end (11) of the shift knob (1), and said harness holder (14) has an aperture (20) for intercommunicating said substantially cylindrical central hollow (17) and said harness-end mounting hole (18) and for permitting said harness end (15a) to fit into said harness-end mounting hole (18).

3. The wiring-harness connection structure as claimed in claim 2, wherein said harness holder (14) has a projection (13) radially outwardly extending from an outer periphery of said harness holder (14), and said lower opening end (11) of the shift knob (1) has a slot (12), and wherein said harness holder (14) is fully fitted to said lower opening end (11) by fully engaging said projection (13) with said slot (12).

4. The wiring-harness connection structure as claimed in claim 3, wherein at least two pairs of said slot (12) and said projection (13) are provided so that said at least two pair are diametrically opposed to each other with respect to a central axis of said lower opening end (11).

5. The wiring-harness connection structure as claimed in claim 4, wherein said harness holder (14) has a flanged portion (14a) and a cut-out (14b), said flanged portion and said cut-out being cooperative with an inner peripheral wall of said lower opening end (11) for defining a slight aperture (14c) between them for removal of said harness holder (14) from said lower opening end (11).

6. The wiring-harness connection structure as claimed in claim 4, wherein said projection (13) of said harness holder has a tapered portion (13a), said tapered portion being up-sloped inwardly and radially with respect to the central axis of said lower opening end (11) so that said harness holder (14) is smoothly snapped back towards a less stressed position in said lower opening end (11).

7. A wiring-harness connection structure of a transmission shift-lever device including a shift knob with a switch, said shift knob being fitted onto an upper end of a shift lever and projected from an elongated shift slot of a position-indicator cover, said connection structure comprising:

a conducting line (6) connected to a switch (3) attached to a shift knob (1) at an upper end thereof, said conducting line (6) partially exposed inside of a lower opening end (11) of the shift knob at a lower end thereof to provide a male plug (8);

a wiring-harness connector (19) having a female receptacle (16) fittable onto said male plug (8), a first caulked portion (21) caulked onto an endmost stripped, non-insulated wire portion of a harness end (15a) of a wiring harness (15), and a second caulked portion (21a) caulked onto a wrapped, insulated wire portion of said harness end (15a);

a conducting-line guide (9c) integrally formed with the shift knob near said lower opening end (11), said conducting-line guide having a guide hole (9d) into which said male plug of said conducting line (6) is inserted and a cylindrical hollow portion (7) into which said male plug (8) is partially exposed via said guide hole (9d), said conducting-line guide (9c) being provided for fully accommodating said harness connector (19) in said cylindrical hollow portion (7) for electrical insulation; and a harness holder (14) having a harness-end mounting hole (18) into which said harness end (15a) is fittable, said harness holder (14) being detachably fitted to the lower opening end (11) of the shift knob (1) for preventing said harness connector (19) and said harness end (15a) in connection from disconnecting from said harness holder (14) by abutment between said second caulked portion (21a) and said harness holder (14).

8. The wiring-harness connection structure as claimed in claim 7, wherein said guide hole (9d), said cylindrical hollow portion (7) and said harness-end mounting hole (18) are aligned with each other with respect to a central axis of said guide hole (9d).

9. The wiring-harness connection structure as claimed in claim 8, wherein said harness holder (14) has a substantially cylindrical central hollow (17) through which an upper end of a shift lever is inserted into said lower opening end (11) of the shift knob (1), and said harness holder (14) has an aperture (20) for intercommunicating said substantially cylindrical central hollow (17) and said harness-end mounting hole (18) and for permitting said harness end (15a) to fit into said harness-end mounting hole (18), and said aperture (20) essentially towards a center axis of said substantially cylindrical central hollow (17).

10. The wiring-harness connection structure as claimed in claim 9, wherein an inside diameter of said harness-end mounting hole (18) is substantially equal to an outside diameter of said insulated wire portion of said harness end (15a), and an inside dimension of said aperture (20) is smaller than the outside diameter of said insulated wire portion, and an outside dimension of said second caulked portion is greater than the outside diameter of said insulated wire portion.

* * * * *